United States Patent [19]

Terörde et al.

[11] Patent Number: 5,814,293
[45] Date of Patent: Sep. 29, 1998

[54] CATALYST FOR THE SELECTIVE OXIDATION OF SULFUR COMPOUNDS TO ELEMENTAL SULFUR, PROCESS FOR PREPARING SUCH CATALYST AND PROCESS FOR THE SELECTIVE OXIDATION OF SULFUR COMPOUNDS TO ELEMENTAL SULFUR

[75] Inventors: Robert Johan Andreas Maria Terörde, Utrecht; John Wilhelm Geus, Bilthoven, both of Netherlands

[73] Assignees: Gastec N.V., Apeldoorn; Comprimo B.V., Amsterdam, both of Netherlands

[21] Appl. No.: 615,307

[22] PCT Filed: Sep. 16, 1994

[86] PCT No.: PCT/NL94/00226

§ 371 Date: Jun. 18, 1996

§ 102(e) Date: Jun. 18, 1996

[87] PCT Pub. No.: WO95/07856

PCT Pub. Date: Mar. 23, 1995

[30] Foreign Application Priority Data

Sep. 17, 1993 [NL] Netherlands ............... 9301615

[51] Int. Cl.⁶ ............... C01B 17/04; B01J 23/58
[52] U.S. Cl. ............... 423/576; 423/576.8; 502/330
[58] Field of Search ............... 423/576, 576.8; 502/330

[56] References Cited

U.S. PATENT DOCUMENTS 4,550,098  10/1985  Gens ............... 423/576.8
5,352,422  10/1994  Vanderbrink et al. ............... 423/576.8
5,366,717  11/1994  Dorshak et al. ............... 423/576.8

FOREIGN PATENT DOCUMENTS 0409353  1/1991  European Pat. Off. .
0422999  4/1991  European Pat. Off. .
   5070  10/1883  United Kingdom ............... 423/576.8
 916793  1/1963  United Kingdom .

OTHER PUBLICATIONS

"Catalytic Oxidation of Hydrogen Sulfide. Influence of Pore Structure and Chemical Composition of Various Porous Substances", Matt Steijns, et al, Ind Eng. Chem., Prod. Res. Dev., vol. 16, No. 1, 1977, pp. 35–41.

Chem. Abstracts, vol. 101, 1984, p. 109, 101:57159s, "*Sulfur Production from Hydrogen Sulfide–Containing Gases from Petroleum Refineries Using Heterogeneous Catalysts*".

Database WPI, Week 8713, Derwent Publications Ltd., London GB; AN 87–091266, A.M. Tsybulevsk, et al, "Catalyst for Sulphur Production in Claus Process, etc." and SU,A, 1 248 648 (Gas Processing Res.) 7 Aug. 1986.

*Primary Examiner*—Gary P. Straub
*Attorney, Agent, or Firm*—Weingarten, Schurgin, Gagnebin & Hayes LLP

[57] ABSTRACT

The invention relates to a catalyst on support for the selective oxidation of sulfur-containing compounds to elemental sulfur, comprising at least one catalytically active material applied to a support material, this catalyst being obtainable by applying the catalytically active material to a support material which comprises at least one alkali metal promotor.

18 Claims, No Drawings

CATALYST FOR THE SELECTIVE OXIDATION OF SULFUR COMPOUNDS TO ELEMENTAL SULFUR, PROCESS FOR PREPARING SUCH CATALYST AND PROCESS FOR THE SELECTIVE OXIDATION OF SULFUR COMPOUNDS TO ELEMENTAL SULFUR

The invention relates to a supported catalyst for the selective oxidation of sulfur compounds, in particular hydrogen sulfide, to elemental sulfur, a process for preparing such catalyst and a process for the selective oxidation of hydrogen sulfide to elemental sulfur.

The necessity of purifying gases which are further treated in chemical processes, supplied to buyers, or discharged to the atmosphere, from sulfur compounds, in particular hydrogen sulfide, is generally known. Accordingly, a number of processes are known which are directed to the removal of hydrogen sulfide from gas.

One of the best-known methods of converting hydrogen sulfide to non-harmful elemental sulfur is the so-called Claus process.

In the Claus process, however, the $H_2S$ is not quantitatively converted to elemental sulfur, mainly as a result of the equilibrium character of the Claus reaction:

$$2\ H_2S + SO_2 \rightarrow 2\ H_2O + 3/n\ S_n \tag{1}$$

A residual content of $H_2O$ and $SO_2$ remains. Now, generally it is not allowed to discharge $H_2S$-containing residual gas, and so the gas must be combusted, whereby the hydrogen sulfide and other sulfur compounds as well as the elemental sulfur present in the gaseous phase are oxidized to sulfur dioxide. As the environmental requirements are becoming stricter, this will not be allowed anymore because the resultant sulfur dioxide emission would be too high. It is therefore necessary to further treat the residual gas of the Claus plant, the so-called tail gas, in a so-called tail gas plant.

Tail gas processes are known to those skilled in the art. The best-known and to date most effective process for the treatment of tail gas is the SCOT process (See GB-A-1,461,070). In this process the tail gas, together with hydrogen, is passed over a cobalt oxide/molybdenum oxide catalyst applied to $Al_2O_3$ as a support, whereby the $SO_2$ present is catalytically reduced to $H_2S$. The total amount of $H_2S$ is then separated in conventional manner by liquid absorption. One drawback of the SCOT process is that it requires a complicated plant. Another drawback is the high energy consumption involved in removing the hydrogen sulfide from the absorbent again.

Another option in converting hydrogen sulfide in tail gas to elemental sulfur is the so-called BSR Selectox process, disclosed in U.S. Pat. No. 4,311,683. According to this process, the $H_2S$-containing gas, mixed with oxygen, is passed over a catalyst containing vanadium oxides and vanadium sulfides on a non-alkaline, porous, refractory oxidic support.

An important drawback of both the SCOT process and the Selectox process is that in both cases the tail gas, after hydrogenation of the sulfur components present to $H_2S$, must first be cooled to remove the greater part of the water, because water greatly interferes with the absorption and the oxidation of $H_2S$. Due to the associated high investments involved, the costs of tail gas treatments according to these known methods are high.

Another process for the oxidation of $H_2S$ to elemental sulfur is disclosed in U.S. Pat. No. 4,197,277. According to this publication, the hydrogen sulfide-containing gas is passed with an oxidizing gas over a catalyst which comprises iron oxides and vanadium oxides as active material and aluminum oxide as support material. Further, the support material, which has been impregnated with the active material, has a specific surface larger than 30 m$^2$/g and a pore volume of 0.4–0.8 cm$^3$/g, while at least 12.5% of the total pore volume is constituted by pores having a diameter greater than 300 Å. It has been found that this catalyst gives rise to at least a partial Claus equilibrium, so that the formation of $SO_2$ cannot be prevented. As a result, the effectiveness of this process is insufficient. The effectiveness with respect to the conversion of $H_2S$ to elemental sulfur may generally be adversely affected by the occurrence of the following side reactions:

1. the continued oxidation of sulfur:

$$1/n\ S_n + O_2 \rightarrow SO_2 \tag{2}$$

2. the reversed (or rather reversing) Claus equilibrium reaction:

$$3/n\ S_n + 2\ H_2O \leftrightarrow 2\ H_2S + SO_2 \tag{3}$$

Here the sulfur, once it has been formed, enters into a reverse reaction with the water vapor also present to form hydrogen sulfide and sulfur dioxide.

The occurrence of the side reactions mentioned above is partly determined by practical conditions.

In general tail gas comprises, in addition to elemental sulfur, a considerable amount of water vapor, which amount may be within the range of 10–40% by volume. The water vapor strongly promotes the reversing Claus reaction. The substantial removal of water vapor has evident technical disadvantages, such as the necessity of an additional cooling/heating stage, an additional sulfur recovery stage or a hydrogenation stage followed by a water-removing quench stage. A process in which the conversion to elemental sulfur is not influenced by the water content of the feed gas is therefore desirable.

Another important circumstance is that generally in the selective oxidation some excess of oxygen will be used not only to prevent the $H_2S$ from "slipping through" but also on the ground of considerations of control technology. This very excess of oxygen, however, may give rise to the continued oxidation of the elemental sulfur formed, thereby adversely affecting the effectiveness of the process.

U.S. Pat. No. 4,818,740, which is incorporated herein by reference, discloses a catalyst for the selective oxidation to elemental sulfur, the use of which prevents the above side reactions to a large extent, while the main reaction $$H_2S + 1/2 O_2 \rightarrow H_2O + \frac{1}{n} S_n \tag{4}$$

takes place with a sufficient degree of conversion and selectivity.

The catalyst according to that patent comprises a support of which the surface exposed to the gaseous phase does not exhibit any alkaline properties under the reaction conditions, while a catalytically active material is applied to this surface. Further, the specific surface area of this catalyst is less than 20 m$^2$/g and less than 10% of the total pore volume in this catalyst has a pore radius in the range of 5–500 Å.

An improvement of the method disclosed in the above-mentioned U.S. Pat. No. 4,818,740 is disclosed in European patent publication 409,353, which is incorporated herein by reference. This patent publication relates to a catalyst for the selective oxidation of sulfur-containing compounds to elemental sulfur, comprising at least one catalytically active material and optionally a support, which catalyst has a specific surface area of more than 20 m²/g and an average pore radius of at least 25 Å, while the catalyst exhibits substantially no activity towards the Claus reaction under the reaction conditions.

It has been found that the catalyst according to this European patent publication gives a clear improvement in the activity and selectivity of the catalysts. In spite of this, there remains a need for an improvement of the catalyst in order to increase the yield of elemental sulfur.

The object of the present invention is to provide a catalyst for the selective oxidation of sulfur compounds to elemental sulfur, which shows a higher conversion of the sulfur-containing compounds to elemental sulfur.

The invention relates to a catalyst on support for the selective oxidation of sulfur-containing compounds to elemental sulfur, comprising at least one catalytically active material applied to a support material, which catalyst is obtainable by applying the catalytically active material to a support material which comprises at least one alkali metal promoter.

Surprisingly, it has been found that such a supported catalyst shows an improved conversion of sulfur-containing compounds to elemental sulfur. In this connection, it is essential that the alkali metal promoter is present in the support. It has been found that this can be realized only by providing the catalytically active material on a support which contains the alkali metal promoter. This can be effected by applying the alkali metal promoter during the preparation of the support or during the shaping thereof (extrusion, tabletting, granulation, etc.). It is also possible to impregnate the support with a solution of the alkali metal promoter prior to the application of the catalytically active material. A simultaneous application of the two components does not lead to an improvement of the elemental sulfur yield.

According to the invention, therefore, it is essential that the alkali metal promoter is not applied to the catalyst simultaneously with or after the active component. It has been found the activity of the catalyst does not improve or may even deteriorate if the promoter is applied to the catalyst simultaneously with or after the active component.

The catalysts according to the invention can have a specific surface area which can vary within wide limits. Starting from the given that the catalyst preferably exhibits substantially no activity towards the Claus reaction under the reaction conditions, a skilled artisan can determine the desired specific surface area. This surface area also depends on the nature of the support, a smaller surface area being desirable for aluminum oxide supports than for silicon oxide supports.

According to one embodiment, a catalyst according to the invention has a specific surface area of more than 20 m²/g and an average pore radius of at least 25 Å. Such a catalyst preferably has silicon oxide as a support.

According to another embodiment of the invention, the catalyst has a specific surface area of less than 20 m²/g and less than 10% of the total pore volume in this catalyst has a pore radius between 5 and 500 Å. With such a catalyst, it will be preferred to start from aluminum oxide as support.

It is noted that in the present invention the absence of Claus activity is defined as the absence of the influence of water on the selectivity of the oxidation reaction of $H_2S$ to sulfur in the presence of minimally a stoichiometric amount of $O_2$ at 250° C. More particularly, this means that in the presence of 30% by volume of water the selectivity of the reaction to elemental sulfur should not be more than 15% lower than the selectivity in the absence of water. This definition of the Claus activity is based on the equilibrium Claus reaction $$3/n\ S_n + 2\ H_2O \text{<->} 2\ H_2S + SO_2 \tag{3}$$

If a material is Claus active, the presence of water results in the reaction proceeding in the direction of $H_2S$ and $SO_2$, whereby a part of the sulfur is converted to $H_2S$ and $SO_2$ again. $H_2S$ is then oxidized with the $O_2$ present to sulfur and water vapor, whereafter the Claus active catalyst converts the sulfur to $SO_2$ again. Due to the concurrence of these reactions a catalyst with Claus active sites will, in the presence of water, give rise to a strong decrease in selectivity.

Within the scope of the invention "specific surface area" means the BET surface area as defined by S. Brunauer et al., in J.A.C.S. 60, 309 (1938). Use was made of a nitrogen adsorption at 77K according to the so-called three-point measurement. For the purpose of the calculation, the surface area of a nitrogen molecule was assumed to be 16.2 Å².

The average pore radius is determined starting from a cylindrical pore model, using the following formula:

$$\text{Average pore radius (Å)} = \frac{20{,}000 \times \text{pore volume (cm3/g)}}{\text{BET surface area (m}^2\text{/g)}}$$

The pore volume used herein is gravimetrically determined by impregnation with water in vacuo. The specific pore volume can also be determined using mercury porosimetry up to a pressure of 2000 bar. The values obtained by the two methods show a good correspondence.

The specific surface area of the catalyst according to the invention can correspond with the values according to U.S. Pat. No. 4,818,740 as well as with the values according to European patent publication 409,353. More particularly, the specific surface area is at least 25 m²/g, since a good activity can be obtained with such values.

Preferably, the specific surface area of the catalyst will not be larger than 300 m²/g of catalyst. In general no specific additional advantages can be gained with higher values.

The requirement as regards the average pore radius is relevant in connection with the nature of the reaction. Too many small pores involve the danger of continued oxidation of sulfur to $SO_2$ due to the sulfur remaining in the pores too long, which is undesirable. The average pore radius is generally preferably at least 325 Å, while 2000 Å is an upper limit. In general, no additional advantage is to be gained above this limit, while on the other hand problems may arise in the preparation of the support. More particularly, an average pore radius not exceeding 500 Å is preferred.

The nature and amount of the alkali metal promoter can vary. In respect of its nature it is observed that it can be based on the conventional alkali metals, more particularly lithium, rubidium, cesium, potassium and sodium, the last two materials being preferred most.

The amount depends at least partly on the nature and amount of catalytically active material. A preference is expressed for amounts of alkali metal promoter relative to the amount of catalytically active material, both calculated as metal, between 1 and 350 atomic percent, more particularly between 5 and 100 atomic percent.

The catalyst according to the invention generally comprises 0.1–50% by weight, calculated on the total mass of the catalyst, of a material which is catalytically active for the selective oxidation of $H_2S$ to elemental sulfur.

It should be stressed that this relates to the active material which is accessible to the reaction gases. In fact, by sintering or by a different process of preparation, a part of the active material, in particular metal oxide, can be encapsulated, for instance by sintering up narrow pores in the support. However, the difference between encapsulated metal oxide and metal oxide present on the support can easily be determined by temperature programmed reduction (TPR). Details of this measuring technique are described in N. W. Hurst, S. J. Gentry, A. Jones and B. D. McNicol, Catal. Rev. Sci. Eng. 24 (2), 233–309 (1982). The amount of metal oxide present that is accessible to gases can thus be determined.

As catalytically active material, effectively a metal compound is used, or a mixture of metal compounds, optionally in combination with one or more compounds of nonmetals.

Preferably, the catalytically active material used is an iron compound or a compound of iron and chromium is used. Effectively, a molar ratio of Cr:Fe is chosen which is lower than 0.5 and preferably in the range of 0.02–0.3.

The catalyst according to the invention may also contain one or more other promoting materials. Suitable promoting materials according to the invention are phosphorus compounds. These can be applied to the catalyst inter alia by impregnation with a soluble phosphorus compound.

The catalyst consists of a support material to which a catalytically active material has been applied.

Preferably, the active component is present on the support in an amount in the range of 0.1–40% by weight, more preferably 0.1–10% by weight, calculated on the total weight of the catalyst.

Generally, as a support a ceramic material is used which exhibits no Claus activity under reaction conditions or has been deactivated as regards this activity. Suitable materials include aluminum oxide, titanium oxide and silicon oxide.

However, it is also possible to use, as a support, other materials which exhibit no or minimal Claus activity and are thermostable. Examples are thermostable non-ceramic materials, such as metal gauze structures and surfaces of (incompletely) sintered materials. Very suitable is a honeycomb structure having a high thermal conductivity. Suitable materials for such supports are the various metal alloys which are stable under the reaction conditions. Examples are metals such as Fe, Cr or Ni or alloys containing one or more of these metals.

On the surface of these materials, if desired, a layer of oxidic material may be provided as a support for the catalytically active material and which incorporates the alkali metal promoter.

In principle, the catalysts according to the invention can be prepared by the known methods for preparing supported catalysts.

In order to bring the catalyst support into a suitable form, it may, if necessary, be subjected beforehand to a sintering treatment before and/or after application.

A sintering treatment can optionally be carried out with a finished catalyst, whereby micropores are sintered up.

The application of the alkali metal promoter can be effected in a manner which is conventional for the application of components on a supported catalyst. Preferably, sequential precipitation is used, i.e. first precipitating a precursor of the alkali metal promoter, followed by the application of a precursor of the catalytically active component. As alkali metal compound, it is preferred to start from water soluble alkali metal salts, which, after application, are converted into the desired promoter by calcination. Suitable salts are, first of all, nitrates and carbonates, as well as alkali metal salts of organic acids, such as oxalate, citrate, acetate, and formate.

It is also possible to incorporate the alkali metal promoter or precursor thereof into the oxidic material during the preparation of the support material or the shaping thereof. This can be effected by preparing the support from starting materials already incorporating precursor for the alkali metal promoter. It is also possible to add alkali metal compounds during the shaping of the support material.

It is observed that Example 9 of European patent publication 409,353 describes a method in which a coimpregnation of a sodium citrate and an iron compound takes place. As can be derived from the Examples included hereinafter, such coimpregnation does not provide any advantages with regard to activity and selectivity.

In the preparation of supported catalysts, the homogeneous application of the promoting alkali metal and of the catalytically active material to the support material requires particular care, and furthermore it must be ensured that this homogeneity is maintained during and after the drying procedure.

To satisfy these requirements, it is quite eligible in the preparation of such catalysts to utilize the "dry" impregnation of the support material with a solution of a precursor of the active component or components. This method is known as the so-called incipient wetness method. Good results are obtained with a solution of EDTA or citrate complexes. An amount of a viscosity increasing compound such as hydroxyethyl cellulose may be added to the solution. By impregnating the support material with this solution by means of the incipient wetness method, a catalyst is obtained on which the active material is provided with a high degree of homogeneity.

The invention also relates to a process for the selective oxidation of sulfur-containing compounds, in particular hydrogen sulfide, to elemental sulfur, using the catalyst according to the invention.

According to this process, hydrogen sulfide is oxidized directly to elemental sulfur by passing a hydrogen sulfide-containing gas together with an oxygen-containing gas over the catalyst at an elevated temperature.

It is noted that not only the nature of the catalyst but also the process parameters determine whether optimum results are obtained. Of particular importance are the selected temperature and the contact time for the oxidation. The use of the present catalyst, incidentally, permits tolerating an excess of oxygen and/or the presence of water in the gas to be treated.

The oxidation process is carried out by adding to the hydrogen sulfide-containing gas such an amount of oxygen or an oxygen-containing gas, using a known ratio regulator, that the molar ratio of oxygen to hydrogen sulfide is between 0.5 and 5.0, and preferably between 0.5 and 1.5.

The process according to the invention can be used for the selective oxidation of all gases containing sulfurous compounds, in particular hydrogen sulfide. Examples of processes where the oxidation according to the invention can be suitably used are the processes described in European patent application 91551, European patent application 78690 and U.S. Pat. No. 4,311,683.

The process according to the invention is eminently suitable for oxidizing gas which does not contain more than 1.5% of $H_2S$, because then a normal, adiabatically operating reactor can be used.

In the oxidation the inlet temperature of the catalyst bed is chosen to be above 150° C. and preferably above 170° C. This temperature is partly dictated by the requirement that the temperature of the catalyst bed must be above the dew point temperature of the sulfur formed.

One of the advantages of using the invention resides in the fact that a heightened activity is obtained while the selectivity is maintained, which leads to a better sulfur yield. Also, the gas temperature may be initially lower because the catalyst has a lower initiation temperature. Due to the exothermic character of the oxidation reaction and the fact that if the temperature is too high a non-selective thermal oxidation of the sulfur compounds may occur, lowering the initiation temperature is of great importance for increasing the sulfur yield.

By measures known per se, the maximum temperature in the catalyst bed is generally maintained below 330° C. and preferably below 300° C.

If the $H_2S$ content is higher than 1.5 % by volume, it may be necessary to take measures to avoid the temperature in the oxidation reactor becoming too high due to the reaction heat released. Such measures include, for instance, the use of a cooled reactor, for instance a tubular reactor, where the catalyst is in a tube which is surrounded by a coolant. Such a reactor is described in European patent specification 91551. A reactor containing a cooling element may also be employed. Further, it is possible to return the treated gas to the reactor inlet after cooling, whereby an additional dilution of the gas to be oxidized is attained, or to distribute the gas to be oxidized over a plurality of oxidation reactors while simultaneously distributing the oxidation air over the various reactors.

According to a particular embodiment of the process according to the invention, the catalyst is employed as a fluid medium in a fluidized bed reactor, shortcircuiting being prevented by the arrangement of one or more apertured plates. Thus, optimum heat transfer is obtained.

According to another particular embodiment, the catalyst is utilized in the form of fixed, for instance honeycomb-like, structures of high thermal conductivity, whereby an undesirable increase in the temperature of the catalyst is avoided in a suitable manner.

The process according to the invention can be utilized with particular advantage for the selective oxidation of the hydrogen sulfide-containing residual gases coming from a Claus plant. Apart from the very high selectivity of the catalyst according to the invention, a very important additional advantage thereby obtained is that the removal of water prior to the oxidation is no longer required. If the process according to the invention is used to oxidize the residual gases referred to, these gases can preferably be passed first through a hydrogenation reactor, in which, for instance, a cobalt-molybdenum containing catalyst is present and in which all sulfurous constituents are hydrogenated to hydrogen sulfide.

According to a variant of the process according to the invention, the selective oxidation stage in which the catalyst according to the invention is used is combined with a subsequent hydrogenation stage, followed by absorption of hydrogen sulfide, all this as described in European patent application 71983. In the process, 98% of the sulfur compounds present are thus removed in the part preceding hydrogenation, so that the hydrogenation stage and the absorption mass are not unduly loaded. In this way sulfur recovery percentages of up to 100% can be achieved. According to a variant of this process, it is possible after the hydrogenation stage to use, instead of the absorption mass, a renewed selective oxidation according to the invention, whereby a total sulfur recovery percentage between 99.5 and 99.8% is attained.

Further, the process according to the invention is particularly suitable for desulfurizing, for instance, fuel gases, refinery gases, biogas, coke furnace gas, gaseous effluents of chemical plants such as viscose factories, or gases which are burnt off at gas and/or oil extraction sites.

If in the process according to the invention the sulfur vapor-containing gas coming from the selective oxidation stage, optionally after condensation and separation of the greater part of the sulfur, is passed over a bed where the sulfur is removed by capillary adsorption, the sulfur recovery percentage is increased to virtually 100%.

The invention is illustrated in and by the following examples.

EXAMPLE 1

100 g Silica (Degussa OX50, B.E.T. 44 $m^2/g$) was mixed with 147 ml water and 1.5 g HEC (Hydroxy Ethyl Cellulose) and extruded. The extrusions were dried at 100° C. To obtain sufficient mechanical strength, the extrusions were calcined at 700° C. The preformed support thus obtained had a BET surface area of 45.5 $m^2/g$, a pore volume of 1.1 $cm^3/g$ and an average pore radius of 350 Å.

EXAMPLE 2

5.23 g ammonium iron citrate (16 wt. % Fe) was dissolved in demineralized water and supplemented to 25 ml. An amount of 10 g of the extrusions obtained in Example 1 was impregnated with 11 ml of the above solution. The extrusions were first dried at room temperature for 3 hours and then at 120° C. for another 3 hours. The dried extrusions were calcined in a rotary quartz tube under an air flow of 50 ml/min at 500° C. The catalyst obtained in this manner had a BET surface area of 51 $m^2/g$, an iron oxide content of 5 wt. %.

EXAMPLE 3 (COMPARATIVE)

0.28 g trisodium citrate dihydrate and 5.23 g ammonium iron citrate (16 wt. % Fe) were dissolved in demineralized water and supplemented to 25 ml. An amount of 10 g of the extrusions obtained in Example 1 was impregnated with 11 ml of the above solution. The extrusions were first dried at room temperature for 3 hours and then at 120° C. for another 3 hours. The dried extrusions were calcined in a rotary quartz tube under an air flow of 50 ml/min at 500° C. The catalyst obtained in this manner had a BET surface area of 50 $m^2/g$, an iron oxide content of 5 wt. %. The molar ratio of sodium to iron is 1:5.

EXAMPLE 4

0.28 g trisodium citrate dihydrate was dissolved in demineralized water and supplemented to 25 ml. An amount of 10 g of the extrusions obtained in Example 1 was impregnated with 11 ml of the above solution. The extrusions were first dried at room temperature for 3 hours and then at 120° C. for another 3 hours. The dried extrusions were calcined in a rotary quartz tube under an air flow of 50 ml/min at 500° C. The sodium promoted silica thus obtained had a BET surface of 45 $m^2/g$, a sodium content of 0.29 wt. %.

EXAMPLE 5

5.23 g ammonium iron citrate (16 wt. % Fe) was dissolved in demineralized water and supplemented to 25 ml. An amount of 10 g of the sodium promoted silica obtained in Example 4 was impregnated with 11 ml of the above solution. Again the extrusions were first dried at room temperature for 3 hours and then at 120° C. for another 3 hours, whereafter they were calcined in a rotary quartz tube under an air flow of 50 ml/min at 500° C. The catalyst obtained in this manner had a BET surface of 52 m²/g, an iron oxide content of 5 wt. %. The molar ratio of sodium to iron was 1:5.

EXAMPLES 6, 7 AND 8

From the catalysts prepared according to Examples 2, 3 and 5, sieve fractions were made with a particle size of between 0.4 and 0.6 mm. A quartz reactor tube having an internal diameter of 8 mm was filled with 1 ml of this catalyst. A gas mixture of the following molar composition was passed downflow over the catalyst: 5% $O_2$, 1% $H_2S$, 30% $H_2O$ in He. The space velocity (Nml of gas per ml of catalyst per hour) of the gas was 12,000 $hr^{-1}$. The temperature was raised by steps of 10° C. from 200° C. to 300° C. and then lowered again to 200° C. The sulfur vapor generated was condensed downstream of the reactor at 130° C. The water vapor was removed with a water permeable membrane. The composition of the influent and the effluent gas was determined with a gas chromatograph. The results of the experiments are summarized in Tables 1, 2 and 3.

TABLE 1

| Example | Temperature | Act. | Sel. | Yld |
|---|---|---|---|---|
| 2 | 200 | 33 | 96 | 32 |
| only | 220 | 72 | 96 | 67 |
| iron oxide | 240 | 99 | 94 | 93 |
|  | 250 | 100 | 89 | 89 |
|  | 260 | 100 | 82 | 82 |
|  | 280 | 100 | 60 | 60 |
|  | 300 | 100 | 22 | 22 |

TABLE 2

| Example | Temperature | Act. | Sel. | Yld |
|---|---|---|---|---|
| 3 | 200 | 17 | 94 | 16 |
| sodium-iron | 220 | 39 | 94 | 37 |
| coimpreg- | 240 | 70 | 94 | 66 |
| nation | 250 | 94 | 94 | 88 |
|  | 260 | 99 | 93 | 92 |
|  | 280 | 100 | 88 | 88 |
|  | 300 | 100 | 75 | 75 |

TABLE 3

| Example | Temperature | Act. | Sel. | Yld |
|---|---|---|---|---|
| 5 | 200 | 35 | 96 | 34 |
| sodium-iron | 220 | 64 | 96 | 61 |
| sequential | 240 | 95 | 96 | 91 |
| impregnation | 250 | 100 | 95 | 95 |
|  | 260 | 100 | 93 | 93 |
|  | 280 | 100 | 84 | 84 |
|  | 300 | 100 | 69 | 69 | act. = percentage of converted hydrogen sulfide
sel. = selectivity to elemental sulfur
yld = sulfur yield

EXAMPLE 8

Of the extrusions prepared according to Example 1, a sieve fraction was made having a particle size of between 0.4 and 0.6 mm. A quartz reactor tube having an internal diameter of 8 mm was filled with 1 ml of this sample. Placed hereon was 1 ml of sieve fraction of the catalyst prepared according to Example 2. Under identical conditions to those described in Examples 5, 6 and 7, measurements were performed on this sample. The results of this experiment are summarized in Table 4.

TABLE 4

| Example | Temperature | Act. | Sel. | Yld |
|---|---|---|---|---|
| 8 | 200 | 33 | 96 | 32 |
| iron oxide | 220 | 72 | 96 | 67 |
| catalyst | 240 | 99 | 94 | 93 |
| with silica | 250 | 100 | 89 | 89 |
| under it | 260 | 100 | 79 | 79 |
|  | 280 | 100 | 44 | 44 |
|  | 300 | 100 | 0 | 0 |

EXAMPLE 9

Of the sodium promoted silica prepared according to Example 4, a sieve fraction was made having a particle size of between 0.4 and 0.6 mm. A quartz reactor tube having an internal diameter of 8 mm was filled with 1 ml of this sample. Placed hereon was 1 ml of sieve fraction of the catalyst prepared according to Example 2. Under identical conditions to those described in Examples 5, 6 and 7, measurements were performed on this sample. The results of this experiment coincide exactly with those summarized in Table 1.

We claim:

1. A support-based catalyst for the selective oxidation of sulfur-containing compounds to elemental sulfur, said catalyst comprising
    a) a support material, containing at least one alkali metal promoter, which is thermostable and substantially inert to the Claus reaction; and
    b) at least one catalytically active material applied to said support material containing at least one alkali metal promoter, said catalytically active material selected from the group consisting of iron compounds; and
    a mixture of iron compounds and chromium compounds, wherein the average pore radius of the catalyst is at least 25 Å, and the amount of said alkali metal promoter relative to the amount of said catalytically active material, both calculated as metal, is between 1 and 350 atomic percent.

2. A catalyst according to claim 1, wherein the alkali metal is selected from the group consisting of sodium, potassium, rubidium, cesium and lithium.

3. A catalyst according to claim 2, wherein the amount of alkali metal promoter relative to the amount of catalytically active material, both calculated as metal, is between 5 and 100 atomic percent.

4. A catalyst according to claim 2, wherein the catalyst has a specific surface area greater than 20 m²/g and an average pore radius of at least 200 Å, while under the reaction conditions the catalyst exhibits substantially no activity for the Claus reaction.

5. A catalyst according to claim 1, having a specific surface area greater than 20 m²/g and an average pore radius of at least 200 Å.

6. A catalyst according to claim 1, having a specific surface area greater than 25 m²/g.

7. A catalyst according to claim 1, wherein said average pore radius does not exceed 2000 Å.

8. A catalyst according to claim 1, wherein said support material is $SiO_2$.

9. A catalyst according to claim 1, wherein the amount of said catalytically active material on said support is 0.1–10% by weight, calculated on the total mass of the catalyst.

10. A catalyst according to claim 1, further comprising one or more phosphorus compounds.

11. A process for preparing a catalyst according to claim 1, comprising the steps of a) impregnating a thermostable support which is substantially inert to the Claus reaction with an alkali metal promoter or precursor therefor, and b) applying at least one catalytically active material selected from the group consisting of iron compounds, and iron and chromium compound mixtures, to said support.

12. A process according to claim 11, wherein said impregnation step is accomplished using the incipient wetness method with a solution containing alkali metal ions.

13. The process of claim 11, wherein said catalyst has a specific surface area greater than 25 m$^2$/g and an average pore radius from at least 200 Å to 2000 Å; said support material is $SiO_2$; said catalytically active material is present on the support in an amount of 0.1–10% by weight, calculated on the total mass of the catalyst; and said catalyst contains one or more phosphorus compounds.

14. A process for the selective oxidation of hydrogen sulfide to elemental sulfur, comprising the steps of passing a hydrogen sulfide-containing Claus tail gas, together with an oxygen-containing gas, over the catalyst according to claim 1 at a temperature of no greater than 330° C.

15. A process according to claim 14, characterized in that the molar ratio of oxygen to hydrogen sulfide is maintained between 0.5 and 1.5.

16. The process of claim 15, wherein the amount of hydrogen sulfide in said hydrogen sulfide-containing Claus tail gas is less than about 1.5% by volume.

17. The process of claim 14, wherein the amount of hydrogen sulfide in said hydrogen sulfide-containing Claus tail gas is less than about 1.5% by volume.

18. A process for the selective oxidation hydrogen sulfide to elemental sulfur, comprising the steps of passing a hydrogen sulfide-containing Claus tail gas, together with an oxygen-containing gas, over the catalyst of claim 23 at a temperature of no greater than 330° C., wherein the the molar ratio of oxygen to hydrogen sulfide is maintained between 0.5 and 1.5.

* * * * *